US006879560B1

United States Patent
Cahn

(10) Patent No.: US 6,879,560 B1
(45) Date of Patent: Apr. 12, 2005

(54) SYSTEM AND METHOD FOR LIMITING CONGESTION OVER A SWITCH NETWORK

(75) Inventor: Robert Cahn, Carmel, NY (US)

(73) Assignee: AT&T Corp., New York, NY (US)

( * ) Notice: Subject to any disclaimer, the term of this patent is extended or adjusted under 35 U.S.C. 154(b) by 866 days.

(21) Appl. No.: 09/732,566

(22) Filed: Dec. 8, 2000

(51) Int. Cl.$^7$ .......................................... H04L 12/26
(52) U.S. Cl. ................................. 370/230.1; 370/231
(58) Field of Search ................................ 370/229–236

(56) References Cited

U.S. PATENT DOCUMENTS

| | | | | |
|---|---|---|---|---|
| 4,787,082 A | | 11/1988 | Delaney et al. | ................ 370/85 |
| 4,849,968 A | * | 7/1989 | Turner | ......................... 370/232 |
| 5,734,825 A | | 3/1998 | Lauck et al. | ................. 395/200 |
| 5,745,697 A | | 4/1998 | Charney et al. | ....... 395/200.63 |
| 5,748,612 A | | 5/1998 | Stoevhase et al. | .......... 370/230 |
| 5,856,981 A | | 1/1999 | Voelker | ...................... 371/20.1 |
| 5,968,128 A | | 10/1999 | Lauck et al. | ................. 709/232 |
| 6,011,780 A | | 1/2000 | Vaman et al. | ................ 370/237 |
| 6,381,649 B1 | * | 4/2002 | Carlson | ....................... 709/235 |
| 6,483,805 B1 | * | 11/2002 | Davies et al. | ................ 370/235 |
| 6,690,646 B1 | * | 2/2004 | Fichou et al. | ................ 370/231 |

OTHER PUBLICATIONS

Zhiruo Cao et al., 'Rainbow Fair Queuling: Fair Bandwidth Sharing Without Per–Flow State', IEEE INFOCOM 2000, Mar. 2000, vol. 2, pp. 922–931.*
Sambit Sahu et al., 'A Quantitive Study of Differentiated Services for the Internet', Global Telecommunications Conference–Globecom'99, Dec. 1999, vol. 3, pp. 1808–1817.*

* cited by examiner

Primary Examiner—Melvin Marcelo

(57) ABSTRACT

A system and method for limiting congestion in a network is disclosed. The system includes exchanging data packets through a virtual circuit in a network of links and switches. The system includes at least one switch having a queue within the virtual circuit. The system also includes a message received at the network switches when the queue is congested. The message is propagated through the network. The system also includes an ingress switch having a graceful discard state that responds to the message. The ingress switch discards the data packets that exceed the capacity of the virtual circuit in accordance with the graceful discard state.

28 Claims, 3 Drawing Sheets

SYSTEM AND METHOD FOR LIMITING CONGESTION OVER A SWITCH NETWORK

TECHNICAL FIELD

The present invention relates to digital networks having switches and links and limiting congestion thereon.

BACKGROUND OF THE INVENTION

The use of connection-oriented networks to interconnect data users is becoming increasingly prevalent. As used herein, connection-oriented networks include networks transporting voice, video, data, and the like. Connection-oriented networks can use both real and virtual circuits. One popular arrangement for transmitting data over these networks is the asynchronous transfer mode ("ATM") that transmits data between users as a series of 53 byte cells. Using ATM and other packet-oriented data transmission systems, such as frame relay, the connections between users are over virtual circuits. A virtual circuit is a path for transporting packets between users of the network. Most virtual circuits specify end points and let the network determine the path of the data. In many cases, the connections are permanent virtual circuits ("PVCs").

Virtual circuits allow networks to realize "statistical multiplexing" in that when the virtual circuit is not sending data, the capacity can be used by other virtual circuits that share the link, or trunk. Virtual circuits, however, differ from dedicated lines. First, because their bandwidth is not dedicated, virtual circuits may be offered more cheaply. Second, virtual circuits offer the ability to transport or carry bursts of packets for short periods above the sustained bandwidth capabilities of the network. Bursts do not necessarily cause congestion on the lines.

Permanent virtual circuits remain up for an extended period of time. Most or all of the PVCs are protected in case of a failure condition. During a failure condition, the network attempts to establish an alternate path for the PVCs. Non-availability of links and nodes in a packet-based network can occur for several reasons, including congestion, failures at the links or nodes, or busy processors that have time-outs that expire. When a link or node is unavailable, the network may respond by rerouting the packets to the destination over other links, or trunks. The rerouting may be done according to known protocols within the network. These protocols, however, can lead to more congestion on the network because data packets may be placed on lines that are already congested.

SUMMARY OF THE INVENTION

The present invention includes a system for exchanging data packets through a virtual circuit in a network of links and switches. The system includes at least one switch within the virtual circuit having a queue. The system also includes a message received at the network switches when the queue is congested. The message is propagated through the network. The system also includes an ingress switch having a graceful discard state that responds to the message. The ingress switch discards the data packets that exceed the capacity of the virtual circuit in accordance with the graceful discard state.

DETAILED DESCRIPTION

Embodiments of the present invention limit congestion over network links by discarding data packets that exceed link capacity. A switch in the network determines if a link of a virtual circuit within the network carries data packets exceeding the capacity of the link by the congestion in the queue servicing the link. A switch then selectively discards those data packets exceeding the link capacity. This feature prevents excessive data packets from moving through the network and further congesting links that are near or exceeding bandwidth capacity.

An egress switch is at the destination, and reads the data packets sent over the virtual circuit. The igress switch removes the header and reassembles the data packets in the order received at the ingress switch. Alternatively, the egress switch may identify the correct order of the data packets by reading the header and reassemble the data packets according to this information.

As disclosed above, a virtual circuit may be established using switches and nodes and is responsible for exchanging data packets, or information, between a source and destination. In one embodiment, the virtual circuit may be in a frame relay network.

Figure 1:
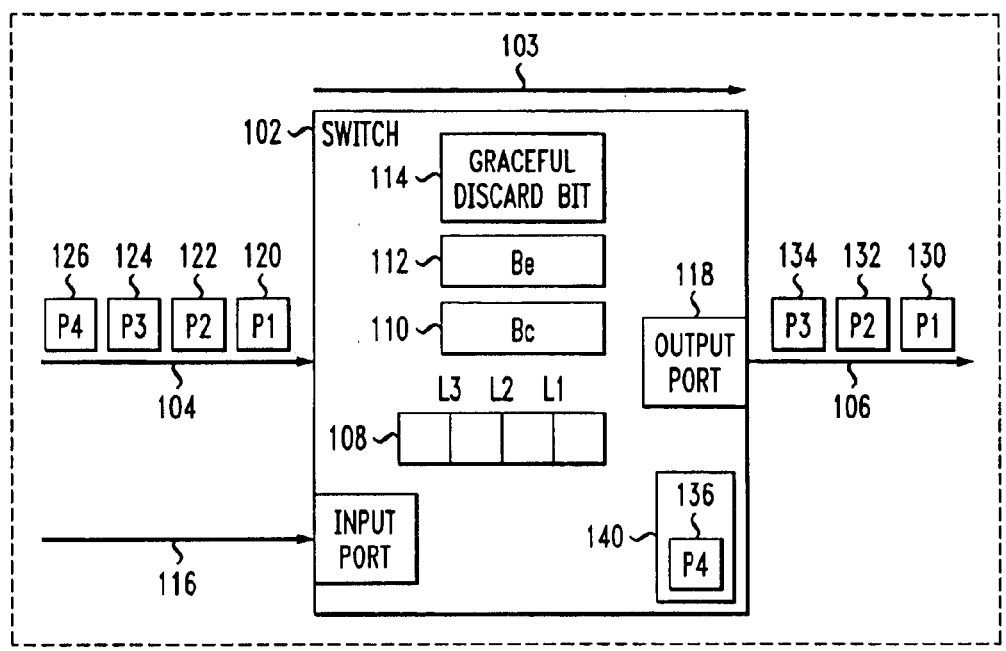
FIG. 1 illustrates a block diagram of a switch in accordance with an, embodiment of the present invention.

FIG. 1 depicts a switch 102 within a network 100 in accordance with an embodiment of the present invention. Switch 102 receives data packets from link 104 and sends some of the data packets along link 106. Switch 102 also may add traffic entering the network 100 to traffic already in transit. Data packets are used over networks transmitting digital signals. The process for using data packets may be termed packet-switching. A message is divided into packets. Packets are units having a variable number of bytes. As opposed to fixed length cells, the network addresses of the source and of the destination are added to the data packet. Each network point, such as a switch, looks at the data packet to see where to send it next.

Switch 102 includes switch fabric that facilitates the data transfer process. Switch 102 selects a path or link for sending data packets to their next destination. Switch 102 also may act as a router by determining the route and, specifically, what adjacent network point the data packet should be sent to.

Data packets 120, 122, 124 and 126 represent data packets within network 100. As depicted in FIG. 1, switch 102 receives data packets 120, 122, 124 and 126 via link 104. Data packets 120, 122, 124 and 126 are comprised of bits of information. The number of bits may vary, and different data packets may have different sizes. The maximum size of a data packet is set differently for different link types, protocols, and different switching systems. The combined size of data packets in a queue serving the link at any given time, however, may exceed the size of the queue, and this condition causes congestion and loss.

When configured to be an ingress switch, switch 102 also includes an input port 116, a congestion register 110, or "Bc", and an excessive register 112, or "Be". Input port 116 couples to a user via a computer, telephone, laptop, modem, or the like. The registers may be used to classify, or mark, the incoming data packets from input port 116. Switch 102 may be part of a virtual circuit within network 100.

As data packets are read into port 116, switch 102 adds a header to the packet that stays with the data packet as it traverses network 100. The header includes the destination of the data packet, the switch to which the data packet is to be sent, and the classification status of the data packet. The header is added only if switch 102 is an ingress switch having an input port 116 coupled to a user. Switches that are not ingress switches may not be able to add header information to incoming data packets. As data packets traverse network 100, switches receiving the data packets will read the header information and route the data packets to their destination over the identified virtual circuit.

The bandwidth of a virtual circuit may be expressed as a Committed Information Rate ("CIR") and is in bits per second. Links over network 100, such as links 104 and 106, may be limited in their traffic capacity by the bandwidth, or CIR, they are able to carry. For example, a virtual circuit over links 104 and 106 may have a bandwidth of 600 Kbits. Any data packet traffic over 600 Kbits may result in congestion over that link and impede the network. Thus, it would be desirable to be able to identify data packets or potential congestion problems before they enter the virtual circuit, or network 100.

Switch 102 determines the amount of bits in each data packet and classifies the data packet prior to entering a link. Data packets within the bandwidth capabilities of a virtual circuit may be classified as acceptable. To indicate the data packet is acceptable, bits may be set in the data packet header. Further, acceptable data packets may be termed "green" to suggest the data packets are within the permanent virtual circuit capacity. Data packets slightly exceeding the bandwidth of the virtual circuit may be classified as burst. Data packets exceeding the bandwidth of the virtual circuit may be classified as excessive. The classifications are placed on the data packet headers by the ingress switch as they enter the virtual circuit. The data packets retain their classification as they move through network 100.

For example, data packets 120, 122, 124 and 126 may each be 8800 bits long. If switch 102 sends out four data packets a second, data packets 120, 122, 124 and 126 will be marked as follows. Congestion counter 110 may specify a bandwidth of 16000 bits/second. Congestion counter 110 is an ingress port function. This number also may be known as a congestion factor. Traffic above the bandwidth may cause congestion in the circuit. Thus, according to the parameters given above, the first two packets may be marked green, though they exceed the bandwidth by 1600 bits/sec. The bit amount available, however, in congestion counter 110 for the next second is reduced to 14400 kbits/sec. Thus, packets 120 and 122 will be classifed acceptable, or "green," by switch 102 at port 116. The green data packets are represented by data packets 130 and 132.

Because the bandwidth of the circuit is now exceeded, the next data packet 124 will be classified burst, or "amber," by switch 102 at port 116. Using burst as a classification allows the network to know that data packet 124 carries traffic in slight excess of the CIR. For example, excessive counter 112 may be 4000 bits/sec. This number also may be known as a burst factor. The virtual circuit can accommodate bursts up to 4000 bits/sec over the bandwidth capacity. Thus, data packet 124 may be classified burst. Data packet 124, however, overuses the excessive counter 112 by 4800 bits. Thus, in the next second, the excessive counter 112 will be set to −800 bits/sec.

By exceeding the congestion factor for acceptable data packets and the burst factor for the burst data packet, network 100 accounts for the number of bits over the limit during the next sample period. Preferably, the sample period is a second. Thus, in the next second, the amount available for green data and amber data will be reduced.

Data packet 126 is the last data packet in input port 116. Data packet 126 does not fit within either congestion counter 110 or excessive counter 112. Data packet 126 overextends the bandwidth parameters. Thus, data packet 126 will be marked excessive, or "red."

Switch 102 may indicate the graceful discard states of the virtual circuits within network 100. The graceful discard state of a virtual circuit determines if excessive data packets are put onto the respective virtual circuit, or discarded at the ingress switch. Graceful discard bits 114 indicate that the switch 102 is in a graceful discard on or off state. Switch 102 has a graceful discard bit for each virtual circuit. When the graceful discard function is off, the data packets classified excessive are allowed onto the network 100. Using the example above, data packet 126 may be allowed on the network 100. When the graceful discard function is on, the excessive data packets are not allowed onto the network 100. Graceful discards bits 114 indicate when the graceful discard function is on or off.

When traffic on a link exceeds the bandwidth of a link, then the link is over committed. This condition may be called negative bandwidth. During a "negative bandwidth" condition, the present invention turns the graceful discard function on. Any data packets marked red will not be allowed onto network 100 that traverse the link in negative bandwidth.

Thus, if switch 102 is an ingress switch, then data packets enter network 100 at switch 102. The data packets enter switch 102 at input port 116. As input port 116 receives the data packets, the size of the data packets determines their marking for moving through network 100. Counters 110 and 112 help to classify the data packets, which may be marked green, amber or red. The data packets leave switch 102 by output port 118 to link 106.

Switch 102 also may receive data packets as an intermediate switch. Switch 102 may be a node within a virtual circuit in network 100 that receives data packets and sends them to their destination. Switch 102 reads data packets 120, 122, 124 and 126 for destination information. Switch 102 then places the data packets into a queue 108, where the data packets are stored. Preferably, the queue 108 is a first in, first out queue. Queue 108, however, may be set up to arrange data packets in any manner.

Referring to FIG. 1, switch 102 places data packets 120, 122, 124 and 126 in queue 108. Queue 106 is a buffer of fast memory. The data packets are placed on link 108 by switch 102. Queue 108 may have states that determine whether data packets received at switch 102 are kept or discarded. The first state is uncongested, when the queue 108 is less than a quarter full or below level L1. All incoming data packets may be placed into the queue. The next state is mildly congested, when queue 108 is more than a quarter full but less than half full, or between levels L1 and L2. Any red packet is discarded. The next state is severely congested, when queue 108 is more than half full but not completely full, or between levels L2 and L3. Both red and amber data packets are not placed in queue 108. The next state is fully congested, when queue 108 is full, or above level L3. During full congestion, only network 100 control packets are placed in queue 108. All other data packets are discarded. The shortcoming with this process is that red packets are allowed on the network 100 prior to being discarded. The links are over-committed to excessive data packets that will be discarded at their destination switch. Thus, network 100 resources are not utilized efficiently.

The present invention avoids this shortcoming by discarding red packets at the ingress switch, prior to being placed on link 106. Further, data packets that eventually are discarded do not tie up links and virtual circuit bandwidth capacity. Virtual circuits in negative bandwidth do not receive red data packet traffic.

As switch 102 detects congestion at the levels disclosed above, messages are sent to other switches, or nodes, within network 100 that a link is congested. This procedure may be known as flooding. Switches within network 100 include a control processor. The control processors send and receive control message traffic between the switches. Control traffic is internal to the network, as opposed to user traffic. Messages between the control processors are marked as such.

The messages communicated between the switches in network 100 may be called link state advertisements ("LSAs"). LSAs are sent to switches in network 100 whenever significant changes occur on a link attached to that switch. Thus, switches in network 100 are made aware when a link is congested, or in "negative bandwidth". As discussed above, congestion on a link is determined by the queue of a switch attached to the link.

If switch 102 is the ingress switch, then switch 102 will be notified by LSAs that a link is congested. Switch 102 receives the LSA from another switch in network 100. As data packets are read through input port 116, switch 102 determines the destination of the data packets. If the destination does not include a virtual circuit that uses the congested link and graceful discard state is off, then the data packet is classified green, amber or red, and placed on the network 100. If graceful discard state is on, then the data packet is classified green or amber, and placed on network 100.

In accordance with an embodiment of the present invention, if the destination includes the congested link, then switch 102 acts in the following manner. Graceful discard bit 114 for the affected virtual circuit is turned on. Thus, switch 102 does not place red data packets on the network 100. By not placing red packets on network 100, network 100 resources are not devoted to moving excessive data packets on network 100, only to be discarded at the switch coupled to the congested link.

If switch 102 is an ingress switch, data packets are classified using counters 110 and 112. Green and amber data packets are placed on network 100. Red data packets are discarded. In another embodiment, red and amber data packets may be discarded.

As discussed above, if switch 102 is an ingress switch, the data packets 120, 122, 124 and 126 are classified as they enter input port 116. Data packets 120 and 122 do not exceed the size of counter 110, and are marked green. Data packet 124 exceeds counter 110, but not counter 112. Thus, data packet 124 slightly exceeds the bandwidth of network 100, and is marked amber. If data packets 120, 122 and 124 flow over a congested link, they are still placed on network 100.

Data packet 126 exceeds the size of both counters 110 and 112 and, thus, significantly exceeds the bandwidth of network 100. Data packet 126 is marked red. Because graceful discard bit 114 is turned on, data packet 126 is discarded.

Data packets 130, 132, 134 and 136 correspond to data packets 120, 122, 124 and 126, respectively, after passing through switch 102. Data packets 130, 132 and 134 are marked and placed on link 106 through output port 118. Data packet 136, however, is placed in discard bin 140. Data packet 136 then may be sent onto network 100. In the alternative embodiment, the egress switch may be able to detect the delayed data packet 136 and complete the reassembling of the other data packets.

Thus, the present invention detects congestion over a link within a virtual circuit in network 100. Switch 102 receives a message regarding the congested link and turns on its graceful discard function. Data packets classified as red, or exceeding network bandwidth, are discarded at switch 102. Red data packets are not placed on network 100.

When the congested link recovers, the change is noted by the switch coupled to the congested link. In other words, the queue of the switch is not full, or above the levels disclosed above. Switch 102 receives an LSA from the switch that the congested link has recovered. Switch 102 turns off the graceful discard bit 114 if graceful discard bit 114 is turned on. Red data packets may be placed on network 100 until another congestion condition is detected.

By not placing red data packets on the network 100 during negative bandwidth or congestion on the links, the present invention does not facilitate continued congestion. The virtual circuits on network 100 can handle bursts of data, but additional data will stifle traffic and tie up links. By discarding data packets at the ingress switch, the excessive data is never placed on the network 100.

Another embodiment of the present invention does not include data bursts or amber data packets. Data packets are classified as green and red. Thus, switch 102 only may include congestion counter 110. No amber data packets are allowed. Any data packet that exceeds the bandwidth capacity is classified red and discarded. Thus, in the example provided above, data packets 124 and 126 would be marked red and discarded by switch 102 in this embodiment.

Figure 2:
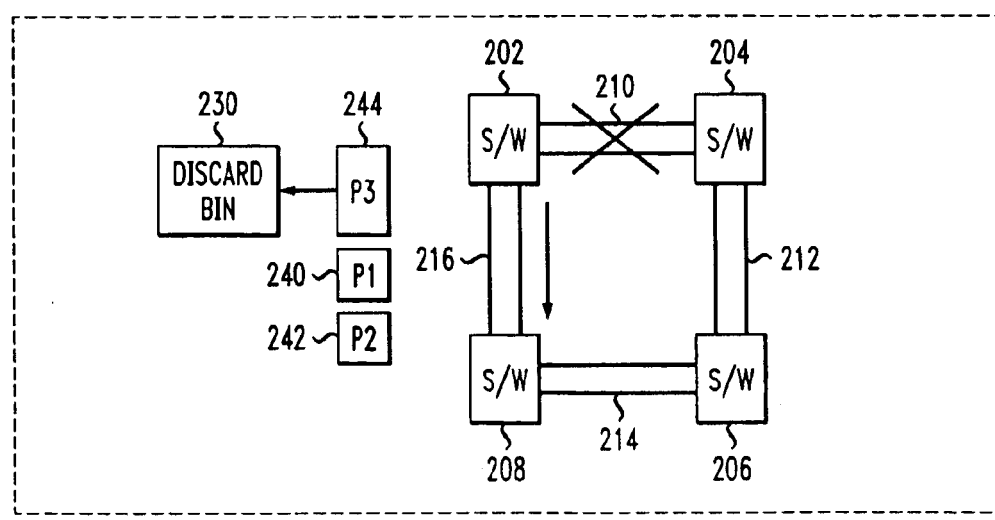
FIG. 2 illustrates a network having multiple switches and links in accordance with another embodiment of the present invention.

FIG. 2 depicts network 200 having multiple switches and links in accordance with another embodiment of the present invention. Network 200 is a digital network that communicates data from one location to another using switches and links. In one embodiment of the present invention, network 200 is a frame relay network in which different logical connections, such as virtual circuits, share the same physical path and some logical connections are given higher bandwidths than others.

Switches 202, 204, 206 and 208 are linked by links 210, 212, 214 and 216. Switch 202 has a graceful discard on and off state, and switch 202 includes counters that classify data packet traffic. Any of the switches 202–206 may serve as a switch that allows data packets to enter network 200. Virtual circuits are created between the switches by links to carry data packets back and forth. For example, a virtual circuit may be created between switch 202 and switch 206 by link 210, switch 204 and link 212. The process of data moving from one switch to another may be termed a "hop." Thus, in the virtual circuit disclosed above, data would travel two hops from source to destination.

For example, the capacity of each link may be 1.5 Mbits/second, or approximately a T1 link. The network 200 then may be able to support five permanent virtual circuits of 600 Kbits/second. The virtual circuits would have the following traffic endpoints: switch 202-switch 204 (one hop), switch 204-switch 206 (one hop), switch 206-switch 208 (one hop), switch 208-switch 202 (one hop), and switch 202-switch 206 (two hops). Thus, the links 210, 212, 214 and 216 have permanent virtual circuits with a total Committed Information Rate of 600 Kbits/sec. The CIR over the links may be adjusted by giving more bandwidth to certain virtual circuits than others. Using statistical multiplexing, network 200 manages the logical connections, or virtual circuits, through the switches connected by the links. Because the CIR can be defined by software supporting network 200, the mix of traffic bandwidths can be redefined in a relatively short period of time.

The virtual circuits within network 200 are limited by the bandwidth given to them. When the bandwidth is exceeded, then the virtual circuit is congested. "Negative bandwidth" may occur when a link in the virtual circuit is oversubscribed to, as disclosed in the discussion of FIG. 1. Network 200 could restrict traffic on an oversubscribed link, but no mechanism exists to communicate to the upper layers of network 200 that a problem exists. These upper layers supply the traffic to network 200. One solution may be to implement complex layer-to-layer signaling, which is cost-prohibitive.

According to the present invention, when a link on network 200 becomes congested, the graceful discard is turned on at the switches of virtual circuits that traverse the link. Data packets that will exceed the bandwidth capacity of the link will be discarded before being placed on network 200 at the first switch. When the link recovers from its congested state, the graceful discard is turned back off.

Referring to FIG. 2, a virtual circuit exists between switch 202 and switch 204 on link 210. A link failure may occur on link 210, which brings down the virtual circuit between switches 202 and 204. Traffic on this virtual circuit would have to be rerouted by network 200. The established CIR over the links would have to be exceeded until link 210 recovers. The bandwidth capacities of the links would be exceeded, resulting in negative bandwidth along links 216, 214 and 212.

As disclosed above, data packets that do not result in negative bandwidth will be classified as green and marked accordingly. Data bursts that result in slightly exceeding the bandwidth capacities of the links will be classified as amber, while those exceeding the bandwidth capacities will be classified as red. Network 200 includes switch 202 receiving data packets 240, 242 and 244. Each data packet has a destination of switch 204. If link 210 is down, data packets 240, 242 and 244 have a three-hop circuit route to switch 204. If link 216, 214 or 212 is operating at or near capacity, traffic to switch 204 may cause congestion along those links. The present invention seeks to prevent placing excessive traffic on network 200 if the links are congested.

For example, if network 200 includes a congested link, data packet 240 is classified green and placed on network 200. Data packet 242 is classified amber. If the network is allowed to burst above the bandwidth, then amber data packets will be allowed onto network 200. If data packet 244 exceeds the burst amount, then data packet 244 will be classified red and discarded at switch 202. The graceful discard bit at switch 202 is turned on, and this prevents data packets marked red from entering network 200. Data packet 244 is prevented from entering the congested link 216. If not discarded, data packet 244 would move through the virtual circuit, only to be discarded at a switch because its queue is congested. The present invention prevents inefficient allocation of network 200 resources to a data packet that eventually is discarded.

Network 200 may have link 210 go out, thereby prohibiting any traffic over link 210. As link 210 is down, virtual circuits including link 210 are re-routed. For data to travel from switch 202 to switch 204, data goes to switch 208 over link 216, to switch 206 over link 214, and then to switch 204 over link 212. As discussed above, these links are set to bandwidths to support the virtual circuits that traverse the links. Adding another virtual circuit, the one supported by downed link 210, will overextend the bandwidth capabilities of links 216, 214 and 212.

As the data traffic for link 210 is re-routed, a point is reached where all the remaining links are driven into negative bandwidth. At this point, LSA messages are flooded from the switches to the rest of network 200. For example, switch 202 may reroute the switch 202–204 traffic onto the virtual circuit of switch 202-switch 208-switch 206-switch 204, and may reroute the switch 202-switch 206 traffic onto the virtual circuit of switch 202-switch 208-switch 206. After rerouting, switch 202 may determine that link 216 has negative bandwidth. The information regarding the negative bandwidth first will reach switch 208. Switch 208 changes the switch 206-switch 208 virtual circuit to the graceful discard on state for traffic leaving switch 208. The LSA message then reaches switch 206. Switch 206 changes the switch 202-switch 206 virtual circuit to the graceful discard on state. The LSA message then reaches switch 204. Because switch 204 knows that the switch 202-switch 204 virtual circuit uses the failed link 210, switch 204 will change the virtual circuit to the graceful discard on state.

A subsequent LSA message notifies the switches that the switch 204-switch 206 virtual circuit is in negative bandwidth. This condition causes the switch 204-switch 206 virtual circuit to set the graceful discard on state. All other virtual circuit graceful discard states were changed by the first LSA message. Finally, the switch 208-switch 206 virtual circuit is advertised as in negative bandwidth, and the graceful discard state for the switch 208-switch 206 virtual circuit is set to on.

The LSA message received at switch 202 indicates congestion exists over link 214. Switch 202 turns on its graceful discard bit in response to the congestion. Thus, any red data packets received at switch 202 will be discarded if they are destined for switches 206 or 204 over link 214.

Switch 202 acts as an ingress switch that classifies the data packets. Data packets 240, 242 and 244 are received by switch 202 to be sent to switch 204. For example, when link 214 is congested, green data packet 240 and amber data packet 242 may be placed on link 216 by switch 202. Data packet 244, however, is classified red by switch 202. Because data packet 244 is to traverse link 214, it is discarded into discard bin 230 by switch 202. Thus, excessive data traffic is not placed on network 200 and network resources are allocated in a more efficient manner.

If red data packet 244 is not discarded until it reaches a congested queue, then red data packet 244 would traverse link 216 only to be discarded by switch 208 in the example given above. In another example, link 210 is down and switch 204 has the queue that detects the congestion. The queues of switches 208 and 206 are not congested. Thus, red data packet 244 would move through network 200 and tie up the resources of switches 208 and 206, and links 216, 214, and 212. According to the present invention, the graceful discard bit at switch 202 is turned on. Red data packet 244 is discarded at switch 202.

Although the examples given above discuss congestion over link 214, any link may be congested, and this congestion may be detected by any switch. Further, any link may go down, which causes switches to re-route data traffic over existing virtual circuits. When a link supporting a virtual circuit goes down, the virtual circuit is reconfigured over other links. The reconfiguration may promote negative bandwidth over these links to support the virtual circuit on top of the virtual circuits already supported by the links. When congestion does occur, the graceful discard bits are turned on at the switches in the network 200. Data packets marked red as they entered the network 200 are discarded. In another embodiment, red and amber data packets may be discarded at the ingress switch. In another embodiment, red, amber and green data packets may be discarded at the ingress switch.

Figure 3:
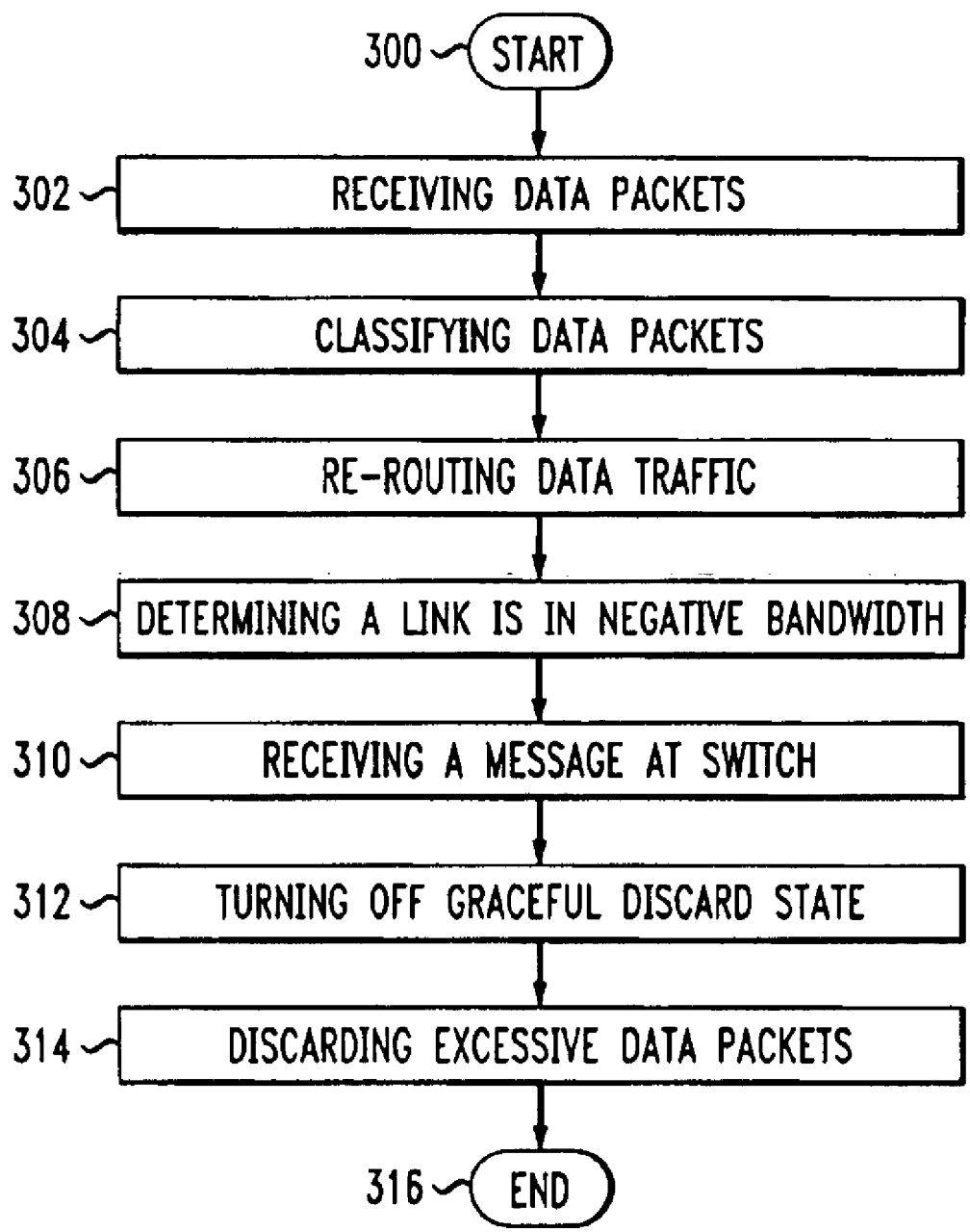
FIG. 3 illustrates a flowchart of a method for limiting congestion on a network in accordance with another embodiment of the present invention.

FIG. 3 depicts a flowchart of a method for limiting congestion on a network in accordance with another embodiment of the present invention. This embodiment may be implemented as instructions executable by a processor and a memory, such as a software program. The code for this program may reside at the switch, or be downloaded by the network.

Step 300 starts the method. Step 302 executes by receiving data packets at the switch 202 from an upper layer that supplies traffic to the permanent virtual circuits within the network 200. Switch 202 may be an ingress switch. Step 304 executes by classifying the data packets according to their data size and the bandwidth capacity of their virtual circuits. Step 304 may use the classification system disclosed above or, alternatively, any classification system that identifies acceptable and excessive data, preferably by comparing the data size to the bandwidth capacity of the virtual circuit using counters at the switch 202.

Step 306 executes by re-routing data traffic from a failed link within network 200. For example, link 210 may be down and link 214 may be tasked to handle the additional traffic to switch 204. Step 308 executes by determining that link 214 is in negative bandwidth as a result of the increased data traffic over link 214. A message, or LSA, is propagated to the switches in network 200. Step 310 executes by receiving a propagated message at the switches within network 200. The message may hop from one switch to another as it propagates through network 200. Step 312 executes by turning on the graceful discard bits at every switch for the virtual circuits that use the congested link. Step 314 executes by discarding data packets classified as excessive at their ingress switch that traverse the congested link. Preferably, these data packets will be marked red. Step 314 ends the method. Preferably, the method ends when link 210 recovers or link 216 is uncongested. Another message, or LSA, is propagated to this effect.

Figure 4:
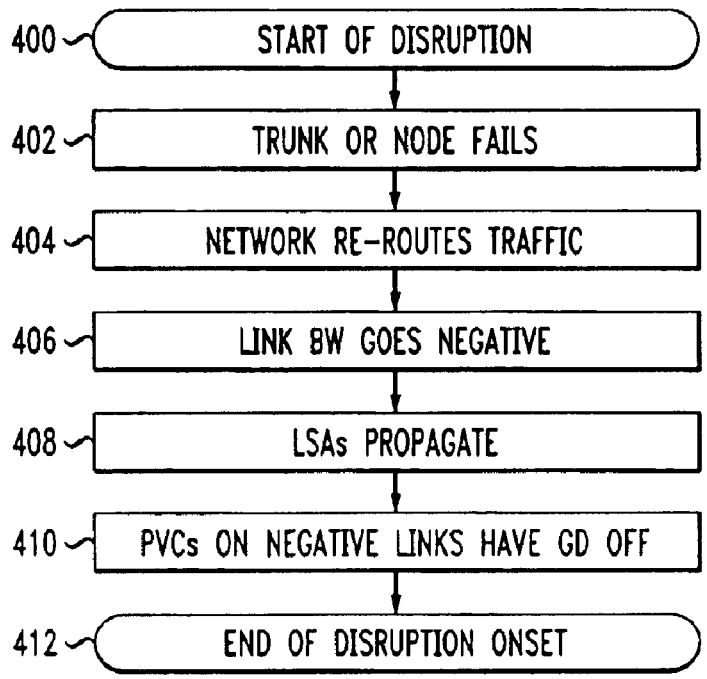
FIG. 4 illustrates a flowchart of a method for resolving a virtual circuit disruption in accordance with another embodiment of the present invention.

FIG. 4 depicts a flowchart of a method for resolving a virtual circuit disruption in accordance with another embodiment of the present invention. This embodiment may be implemented as instructions executable by a processor and a memory, such as a software program. The code for this program may reside at the switch, or be downloaded by the network.

Step 400 executes by a disruption occurring somewhere, for example, network 200. Step 402 executes by a link, trunk or node failing in network 200 where the disruption occurs. The link could be down physically, or out for a period of time. Step 404 executes by network 200 re-routing data traffic in response to the downed link, trunk or node. Step 406 executes by a link or trunk going into negative bandwidth as a result of the increased traffic. Step 408 executes by LSA messages propagating from the switches in network 200. The LSA messages propagate between the switches. Step 410 executes by a switch receiving a message that a link is congested, and that negative bandwidth exists on that virtual circuit. The switch then turns on the graceful discard state for that virtual circuit at the switch. Step 412 executes by ending the method for resolving the network disruption.

Figure 5:
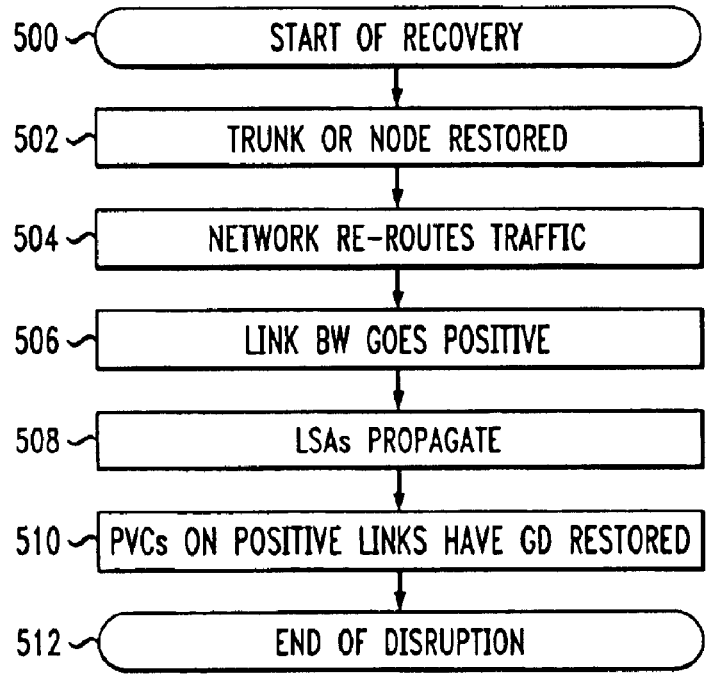
FIG. 5 illustrates a flowchart of a method for recovering virtual circuits in a network in accordance with another embodiment of the present invention.

FIG. 5 depicts a flowchart of a method for recovering the virtual circuits in a network in accordance with another embodiment of the present invention. Step 500 executes by starting recovery of the failed link of FIG. 4. Step 502 executes by restoring the failed link, trunk or node. Step 504 executes by network 200 re-routing data traffic back over the link and re-allocating bandwidth back to the virtual circuits on the link. Step 506 executes by the virtual circuits on the congested link in step 406 going back to positive bandwidth. Step 508 executes by LSA messages propagating from the switches in network 200 that the link has recovered and is not in negative bandwidth. Step 510 executes by the virtual circuits on the link having their graceful discard states turned off at the switches in network 200. Step 512 executes by ending the method.

Many modifications and other embodiments of the present invention will come to mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the following claims.

What is claimed is:

1. A method for limiting congestion in a network, comprising:
   receiving a message at least one switch in said network that data traffic in at least one link of a virtual circuit in said network is exceeding the capacity of said virtual circuit;
   turning on a graceful discard state at said at least one switch; and
   discarding excessive data packets at said at least one switch.

2. The method of claim 1, further comprising classifying said excessive data packets according to a bandwidth of said virtual circuit.

3. The method of claim 2, wherein said classifying includes marking said excessive data packets at said switch.

4. The method of claim 1, further comprising determining said excessive data packets from a plurality of data packets, said excessive data packets significantly exceeding the capacity of said virtual circuit.

5. The method of claim 1, further comprising propagating said message through said network.

6. The method of claim 1, further comprising re-routing said data traffic over said at least one link in said virtual circuit.

7. The method of claim 1, wherein said discarding step includes placing said excessive data packets in a discard bin.

8. The method of claim 1, further comprising recovering said congested link and turning off said graceful discard state.

9. The method of claim 1, further comprising detecting a congested queue at a switch coupled to said at least one congested link.

10. A method for limiting congestion over a virtual circuit in a network having a plurality of links connecting a plurality of switches, comprising:
    determining a congestion condition on one of said plurality of links by detecting a congested queue at one of said plurality of switches connecting to said link; and turning on a graceful discard state at said switches coupled to said virtual circuit.

11. The method of claim 10, wherein said turning on step includes setting a graceful discard state bit at said switches.

12. The method of claim 10, further comprising discarding data packets exceeding the capacity of said virtual circuit at said switches.

13. The method of claim 10, further comprising determining a negative bandwidth condition on said links.

14. A method for limiting congestion on a network, comprising:
   classifying a data packet as excessive at an ingress switch; and
   preventing said excessive data packet traversing said network by
   changing characteristics on said ingress switch by setting a graceful discard state bit to turn on a graceful discard state at said ingress switch, and
   discarding said excessive data packet at said ingress switch.

15. The method of claim 14, further comprising marking said excessive data packet at said ingress switch.

16. The method of claim 14, further comprising allowing non-excessive data packets onto said network.

17. A system for exchanging data packets through a virtual circuit in a network of links and switches, comprising:
   at least one switch within said virtual circuit, said switch having a queue; and
   an ingress switch having a graceful discard state for said virtual circuit responsive to a message propagated from at least one switch when said queue is congested;
   said ingress switch discarding said data packets that exceed the capacity of said virtual circuit in accordance with said graceful discard state.

18. The system of claim 17, wherein said queue includes levels to determine said congestion.

19. The system of claim 17, further comprising a congestion counter at said ingress switch, said congestion counter accepting data packets within the capacity of said virtual circuit.

20. The system of claim 19, further comprising an excessive counter at said ingress switch, said excessive counter accepting data packets slightly exceeding the capacity of said virtual circuit.

21. The system of claim 20, further comprising an input port at said ingress switch to receive said data packets, said congestion counter and said excessive counter responsive to said input port.

22. The system of claim 19, wherein said graceful discard state is indicated by a graceful discard bit.

23. The system of claim 17, wherein said message is a control message received by a control processor at said ingress switch.

24. A method for resolving a virtual circuit disruption in a network, comprising:
   re-routing data traffic over said virtual circuit;
   determining a link in said virtual circuit is at negative bandwidth;
   propagating a message through said network; and
   turning on graceful discard states correlating to said virtual circuit at switches in said network.

25. The method of claim 24, further comprising discarding data packets exceeding the capacity of said virtual circuit at said switches.

26. The method of claim 24, wherein said re-routing includes re-routing said data traffic from a failed link within said network.

27. A method for recovering from a virtual circuit disruption in a network, comprising:
   restoring data traffic over a failed link within a network;
   determining a congested link in said virtual circuit is at positive bandwidth;
   propagating a message through said network; and
   turning off graceful discard states correlating to said virtual circuit at switches in said network.

28. The method of claim 27, further comprising restoring data traffic over said virtual circuit.

* * * * *